Figure 1:
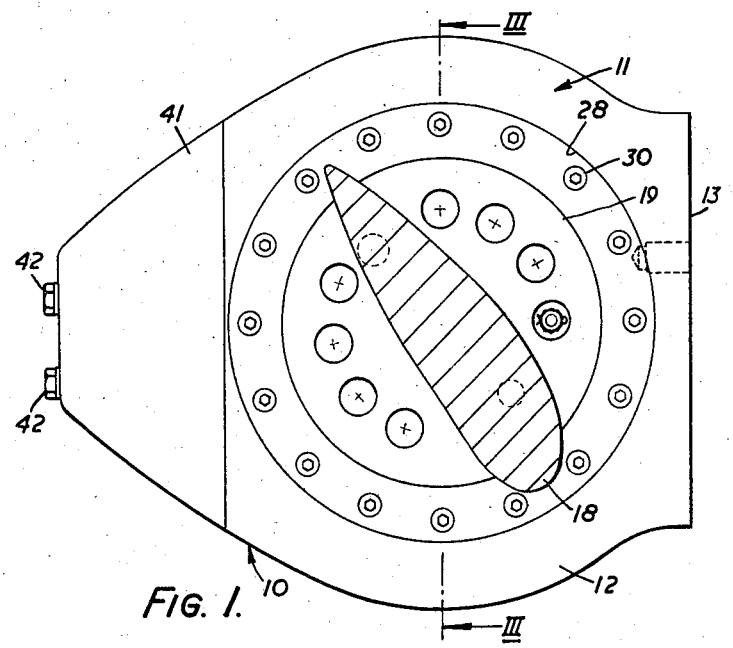

Sept. 17, 1963    J. A. CHADWICK ET AL    3,103,978
VARIABLE PITCH MARINE SCREW PROPELLERS
Filed Sept. 22, 1961    2 Sheets-Sheet 1

INVENTORS
JAMES ALEXANDER CHADWICK
DAVID DEXTER MASON
BY Irwin S. Thompson
ATTORNEY Sept. 17, 1963    J. A. CHADWICK ET AL    3,103,978
VARIABLE PITCH MARINE SCREW PROPELLERS
Filed Sept. 22, 1961    2 Sheets-Sheet 2

INVENTORS
JAMES ALEXANDER CHADWICK
DAVID DEXTER MASON
BY Irwin J. Thompson
ATTORNEY

United States Patent Office 3,103,978
Patented Sept. 17, 1963

3,103,978
VARIABLE PITCH MARINE SCREW PROPELLERS
James Alexander Chadwick, Loughborough, and David Dexter Mason, West Bridgeford, Nottingham, England, assignors to Slack & Parr (Marine) Limited, Kegworth, England
Filed Sept. 22, 1961, Ser. No. 140,003
Claims priority, application Great Britain Sept. 24, 1960
16 Claims. (Cl. 170—160.47)

This invention relates to variable pitch marine screw propellers, and has particular reference to the hub construction of such propellers.

Variable pitch propellers have a hub from which the propeller blades project radially, the blade roots being mounted in bearings in the hub and attached to corresponding crank discs which engage a crosshead mounted for movement axially within the hub structure so that controlled axial movement of the crosshead turns the blades in unison to vary the propeller pitch. In order to reduce the overall hub dimensions it has been proposed to split the hub so that it can be assembled around the crosshead and blade roots as an alternative to providing the hub with a large enough end aperture through which the crosshead can be inserted prior to fitting the blades and crank discs from outside the hub, and the main object of the invention is to provide a hub structure of more simple and rigid construction which also has the advantage of not requiring an end aperture through which the crosshead can pass.

A further object is to provide a hub construction in which access along the axis of the hub is not required to dismantle or assemble the hub in position on a corresponding propeller shaft. This is a marked advantage when the propeller is mounted close up to a rudder.

With these objects in view the invention comprises a marine screw propeller in which one of the assemblies formed by a blade and crank disc is mounted in a separate blade bearing ring fitted in a corresponding recess in the hub, the dimensions of a bore through the recess to the interior of the hub being such that the crosshead can be inserted therethrough into position within the hub before the bearing ring together with the corresponding propeller blade is fitted.

The invention is particularly well suited for remaining blade or blades may conveniently be mounted in bearing rings formed integrally with the main body of the hub. It will be appreciated that a propeller in accordance with the invention has a hub which is not only of rigid and simple construction but also facilitates propeller assembly, said remaining blades being first fitted and the corresponding crank discs attached to locate them in the hub, the crosshead then inserted through the recess bore into engagement with the crank discs and the remaining blade mounted in the removable bearing ring which is finally received in position in the recess. Only a small rear end aperture need be left for attachment of the crosshead to the usual pitch control shaft, and hence only a comparatively small diameter seal is required which is of marked advantage.

Preferably the crosshead is of solid construction so that no assembly of the latter within the hub is required and it is conveniently mounted on guide bars which are fitted from the rear of the hub after the crosshead has been inserted therein.

The invention will now be further described with reference to the accompanying drawings which illustrate, by way of example, a three-bladed variable pitch marine screw propeller in accordance with the invention, and in which:

FIGURE 1 is a plan view with one of the blades in its uppermost position, that blade being shown in section.

Figure 2:
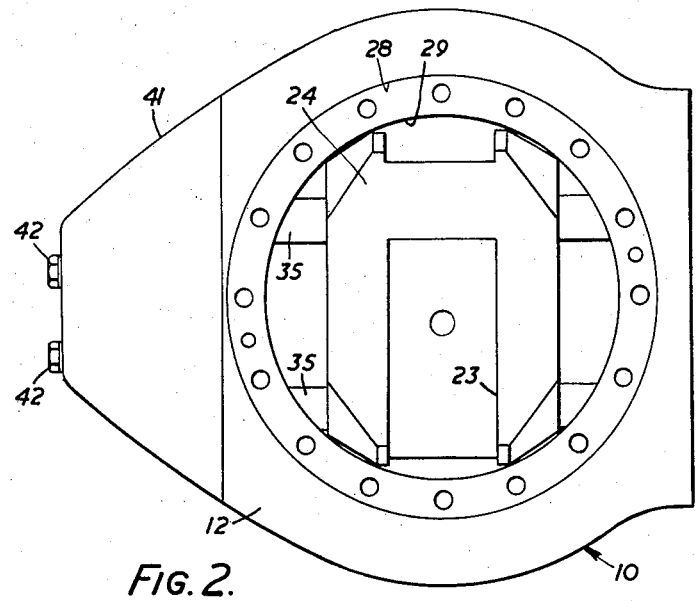
Figure 3:
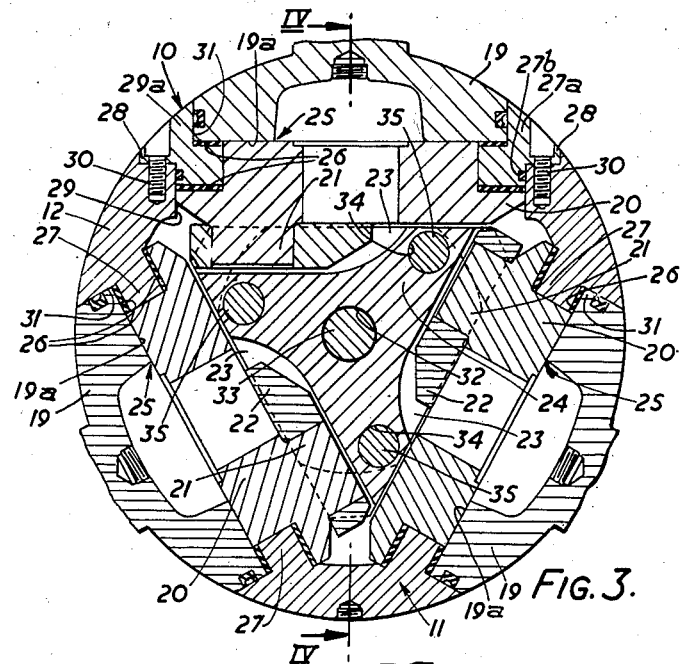
Figure 4:
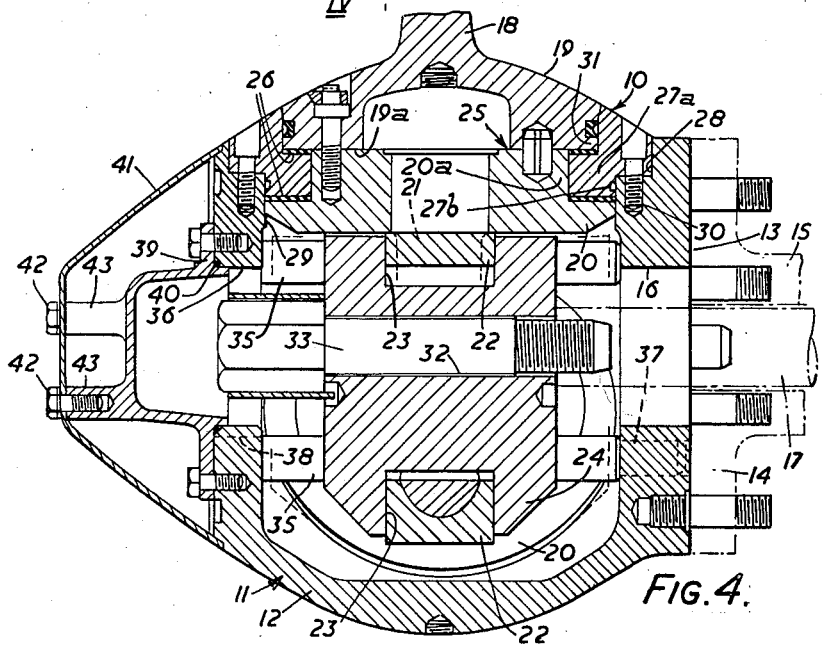

FIGURE 2 is a similar view with that blade and an associated bearing ring removed to show the internal structure of the propeller hub, FIGURE 3 is a sectional view on the line III—III in FIGURE 1, and FIGURE 4 is a sectional view on the line IV—IV in FIGURE 3, Referring to the drawings, the propeller 10 illustrated therein has a hub 11 the main body 12 of which as a forward mounting face 13 for bolting to a driving flange, indicated at 14 in FIGURE 4, on the rear end of a propeller shaft 15. The fact 13 has a central aperture 16 through which passes a control rod, indicated at 17 in FIGURE 4, for controlling the propeller pitch. The control rod 17 is axially slidable within the propeller shaft 15, in the usual manner. As usual the blades one of which is shown at 18 in FIGURES 1 and 4, are equiangularly arranged radially of the hub 11 with disc-like blade roots 19 mounted in bearings in the hub. A corresponding crank disc 20 is bolted and dowelled to the inner face 19a of each blade root 19 and has an inwardly projecting crank pin 21 carrying a slide block 22 which engages in a transverse slot 23 in a crosshead 24 within the hub.

Each crank disc 20 is of stepped form with a small diameter section 20a adjoining the blade root 19 to provide the blade and crank disc assembly 25 with an annular groove 26 within which a fixed bearing ring 27 or 27a is received. The bearing rings 27, 27, 27a thus locate the respective blades 18 axially and withstand thrust, bending and centrifugal loads on the blades. Two of the bearing rings 27, 27 are formed integrally with the main body 12 of the hub 11 which is also formed with a recess 28 through which a bore 29 passes into the hub and in which the bearing ring 27a, which is separate from the main body 12, is received. This bearing ring 27a is bolted into position on the hub body 12 by means of bolts 30 with the blade 18 and corresponding crank disc 20 already assembled. The main body 12 and the separate bearing ring 27a are externally counterbored as shown at 31 to accommodate the disc-like blade roots 19.

The crosshead 24 is of generally triangular cross-section, as shown in FIGURE 3, with a central axially directed bore 32 for a bolt 33 securing it to the end of the control rod 17; it also has three further axially directed bores 34 adjacent the apices of its cross-section by which it is slidably mounted on cylindrical guide bars 35. A rear end aperture 36 in the hub body 12 enables the control rod bolt 33 to be fitted and the three guide bars 35 to be inserted through the crosshead 24 and fixed in position between spigot bores 37 in the front end of the hub body 12 and full diameter bores 38 at the rear end of the body through which they are fitted. An end plate 39 with a small diameter seal 40 to suit the aperture 36 seals the latter, achieves endwise location of the guide bars 35 and provides a mounting for an end spinning 41 which shrouds the rear end of the hub 11, the spinning being held in position by a triangular arrangement of bolts 42, only two of which are shown, which engage with rearwardly projecting cylindrical bosses 43 on the end plate 39.

The transverse slots 23 which are individually engaged by the blocks 22 carried on the crank pins 21 are formed laterally in the sides of the crosshead 24 so that movement of the crosshead along the guide bars 35 with the control rod 17 acts through the crank pins 21 to turn the three blades 18 in unison for pitch variation of the propeller 10.

During assembly of the propeller 10 two of the blades 18 are first fitted in the integral bearing rings 27 and axially located therein by attachment of the corresponding crank discs 29 which are inserted sideways on into the hub through the recess bore 29. The crosshead 24 is next also inserted through the recess bore 29 so that the lateral slots 23 on adjacent faces of the crosshead engage the blocks 22 mounted on the corresponding crank pins 21, the design of the crosshead 24 being such that its lateral section can pass through a cylindrical prism of diameter slightly less than the minimum recess bore dimension. After fitting of the guide bars 35 through the crosshead 24 the separate bearing ring 27a with the remaining blade 18 and crank disc 20 assembled therein, is bolted to the hub body 12 by the bolts 30 with the corresponding crank pin 21 and block 22 aligned with its slot 23 in the crosshead. A sealing ring 27b is mounted in an annular groove in the separate bearing ring 27a to prevent ingress of water past the housing bolts 30 to the interior of the hub 11.

We claim:

1. A variable pitch marine screw propeller comprising a hub, a crosshead mounted in said hub for sliding movement which acts to vary said pitch, and an assembly formed by one propeller blade and an associated crank disc mounted in a separate blade bearing ring fitted in a corresponding recess in the hub, said crank disc engaging said crosshead and the dimensions of a bore through the recess to the interior of the hub being such that the crosshead can be inserted therethrough into position within the hub before the bearing ring together with the corresponding propeller blade is fitted.

2. A propeller according to claim 1, wherein the crosshead is of solid construction.

3. A propeller according to claim 2 wherein the crosshead has a central axially directed bore adapted to receive a bolt by which it can be secured to a control rod and has further axially directed bores by which it is slidably mounted on guide bars arranged within the hub.

4. A propeller according to claim 3, wherein the hub body has a rear end aperture to enable the control rod bolt to be inserted into the bore in the crosshead.

5. A propeller according to claim 4, wherein the rear end aperture is sealed by an end plate having a small diameter seal to suit the aperture.

6. A propeller according to claim 5, wherein the rear end of the hub is shrouded by an end spinning for which said end plate provides a mounting.

7. A propeller according to claim 4, wherein the guide bars are fitted through the rear end aperture of the hub after the crosshead has been inserted thereinto.

8. A propeller according to claim 7, wherein the guide bars are fixed in position between spigot bores in the front end of the hub and full diameter bores at the rear end of the latter, endwise location of the guide bars being achieved by said end plate.

9. A variable pitch marine screw propeller comprising a hub, a plurality of radially projecting propeller blade and crank disc assemblies rotatably mounted in said hub for pitch variation of the blades, a crosshead slidably mounted within said hub between said crank discs, and a detachable blade bearing ring in which one of said assemblies is rotatably mounted, the remainder of said assemblies being directly mounted in said hub and the latter having a bore through a recess in which said bearing ring is mounted of dimensions such that the crosshead can be inserted and fitted within the hub through said bore before said bearing ring together with said one assembly is fitted in said recess.

10. A propeller according to claim 9, wherein each remaining blade is first fitted and the corresponding crank disc attached to locate the blade and crank disc in the hub after which the crosshead is inserted through the recess bore into engagement with the or each located disc and the one blade and its associated crank disc mounted in the removable bearing ring is finally secured in position in the recess.

11. A propeller according to claim 9, wherein transverse slots are formed in the sides of the crosshead which engage blocks carried on the crank discs.

12. A variable pitch marine screw propeller comprising a hub, a separate propeller blade bearing ring mounted in a recess in said hub, said recess having a through bore, a plurality of radially projecting propeller blade and crank disc assemblies rotatably mounted in said hub for pitch varying movement and one of which is mounted in said bearing ring, and a crosshead slidably mounted in said hub between said assemblies and in engagement with said crank discs whereby sliding movement of the crosshead produces pitch varying movement of said blades, the dimensions of said bore being such that the crosshead can be inserted and fitted within the hub through said bore before said bearing ring together with said one assembly is fitted in said recess.

13. A variable pitch marine screw propeller comprising a hub, a plurality of radially projecting propeller blade and crank disc assemblies rotatably mounted in said hub for pitch variation of the blades, the propeller blades having disc-like blade roots and the crank discs being of stepped form with small diameter sections adjoining the respective blade roots to provide each blade and crank disc assembly with an annular groove, a crosshead slidably mounted within said hub between said crank discs and in engagement therewith, whereby sliding movement of said crosshead results in pitch variation, and a plurality of blade bearing rings in which said assemblies are rotatably mounted and which engage said annular grooves, one of said bearing rings being detachably mounted in a recess in said hub and the latter having a bore through a recess in which said bearing ring is mounted of dimensions such that the crosshead can be inserted and fitted through said bore within the hub before said detachable bearing ring together with the corresponding one of said assemblies is fitted in said recess.

14. A propeller according to claim 13, wherein the bearing rings are counterbored on their external surfaces to accommodate the disc-like blade roots.

15. A variable pitch marine screw propeller comprising a hub, a separate propeller blade bearing ring mounted in a recess in said hub, said recess having a through bore, three radially projecting propeller blade and crank disc assemblies rotatably mounted in said hub for pitch varying movement and one of which is mounted in said bearing ring and a crosshead of generally triangular cross-section slidably mounted in said hub between said assemblies, each side of the crosshead having a transverse slot formed therein and engaged by the corresponding crank disc whereby sliding movement of the crosshead produces pitch varying movement of said blades, the dimensions of said bore being such that the crosshead can be inserted and fitted within the hub through said bore before said bearing ring together with said one assembly is fitted in said recess.

16. A propeller according to claim 15, wherein the crosshead has three axially directed bores adjacent the apices of its cross-section by which it is slidably mounted on cylindrical guide bars carried by the hub.

References Cited in the file of this patent

UNITED STATES PATENTS

| | | |
|---|---|---|
| 2,517,714 | Roesch | Aug. 8, 1950 |
| 2,612,229 | Tornes et al. | Sept. 30, 1952 |
| 2,763,329 | Feroy | Sept. 18, 1956 |